(No Model.)

S. M. PERRY.
DUST PAN.

No. 248,344.　　　　　　　　　Patented Oct. 18, 1881.

WITNESSES:
Phillips Abbott
Daniel Kenniff

INVENTOR
Samuel M. Perry.
By H. L. Bennew
ATTORNEY.

UNITED STATES PATENT OFFICE.

SAMUEL M. PERRY, OF PLAINFIELD, NEW JERSEY.

DUST-PAN.

SPECIFICATION forming part of Letters Patent No. 248,344, dated October 18, 1881.

Application filed March 26, 1881. (No model.)

To all whom it may concern:

Be it known that I, SAMUEL MOODY PERRY, of Plainfield, in the county of Union and State of New Jersey, have invented certain new and useful Improvements in Dust-Pans, designed to be used with a broom, thereby avoiding the back-breaking operation usual in gathering dust with pan and brush; and the following is a full, clear, and exact description of the same, reference being had to the accompanying drawings, which form a portion of this specification.

In the different figures, A A A A represent the socket for the detachable handle, open at both ends, and connected in a nearly-upright position with the pan, so as to be partially or wholly inside of back of wall of said pan, and fastened by flanges H H H or otherwise to the hood L L and bottom of the pan, or to back wall of pan.

Figure 1:
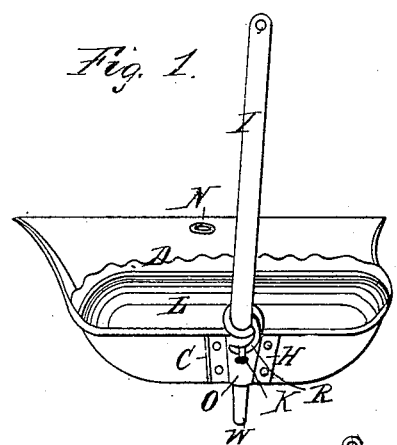
Figure 2:
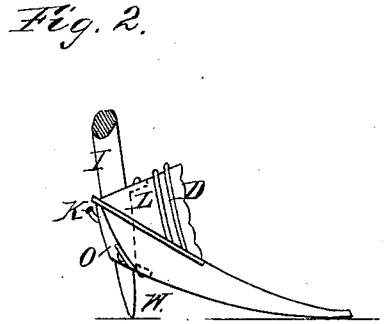

O O in Figs. 1 and 2 show a portion of one side of socket protruding through the back wall in a recess punched through said wall for that purpose, in order that the socket may be placed in its desired position without regard to the angle of back wall, and which makes the pan much stiffer and more compact, allowing them to be packed together closer for transportation.

R R is an inclined slot through the top of side of socket, into which pin K K K on the shank of handle I I I slides and locks on the insertion of said handle-shank into the socket with a twisting motion. The handle I is so formed that it extends through and below the bottom of socket and pan, and forms a foot, W, on which the hind portion of the pan rests, and to raise the same to any desired angle from the floor, and, being detachable, allows the pans (especially the much preferred hooded pan) to be nested together in a compact and safe manner for transportation.

In the ordinary hooded pan the expense of transportation is often nearly as great as the first cost of manufacture, from their inconvenience in packing, space taken, and loss from injury received.

D D show the front edge of hood L L, serrated for the purpose of better catching and drawing from broom the cobwebs, straws, thread, lint, &c., in the act of sweeping the same on pan.

N N show a recess punched out of the bottom of pan, near the center of its front edge, to be used as a cheaper and more convenient substitute for the usual ring for suspending pans when not in use.

Figure 3:
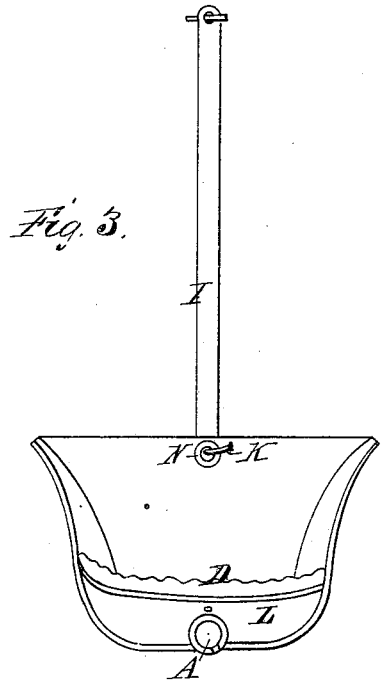

K K K, the pin on shank of handle I I, is formed with a head on its extremity, or it is curved or inclined upward toward the opposite end of handle, on which is an eye, hook, or other suspending fixture, and the handle thus becomes a most convenient and tasteful method by which a pan may be suspended, as shown in Fig. 3.

Figure 4:
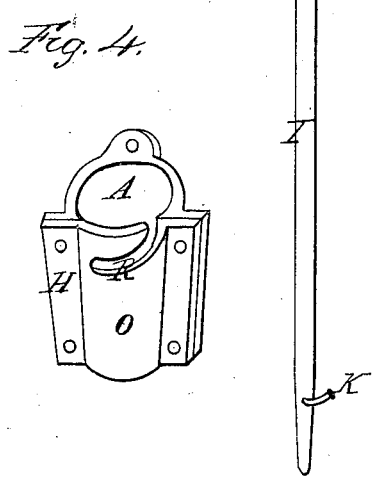

Fig. 4 in the drawings represents an enlarged view of the socket, showing the inclined slot R, flanges H, and portion O, that protrudes through the back wall of pan when in position.

What I claim as my invention, and desire to secure by Letters Patent, is—

1. A dust-pan in combination with the detachable handle, the hood or partial cover, and the detachable leg, for purposes specified.

2. The combination of a removable handle-sustaining socket-recess with a dust-pan, when said socket is immovably fastened in a nearly-upright position partially or wholly inside of the back wall of said pan, for purposes specified.

3. The combination of a dust-pan body, open socket, and detachable handle, when the shank of said handle is formed to extend through said socket and sufficiently below the bottom of pan to form a foot, substantially as shown, for purposes specified.

4. The combination of a dust-pan with a socket having an inclined groove through one side of its top, for purposes specified.

5. In combination with a detachable dust-pan handle-shank end, the headed or curved or inclined pin, for purposes specified.

6. The combination of the serrated edge with the hood of a dust-pan, for purposes set forth.

7. In combination with a dust-pan, the central recess through the front edge of the bottom of said pan, for purposes set forth.

Witness my hand this 21st day of March, A. D. 1881.

SAML. MOODY PERRY.

Witnesses:
W. L. BENNEM,
G. M. BARRETTO.